United States Patent
Lee et al.

(10) Patent No.: US 7,518,617 B2
(45) Date of Patent: Apr. 14, 2009

(54) IMAGE PROCESSING APPARATUS AND METHOD OF THE SAME

(75) Inventors: Hsin-Hung Lee, Fongshan (TW);
Hsu-Hung Chen, Sanchung (TW)

(73) Assignee: Quanta Computer, Inc., Tao Yuan Shien (TW)

( * ) Notice: Subject to any disclaimer, the term of this patent is extended or adjusted under 35 U.S.C. 154(b) by 374 days.

(21) Appl. No.: 11/407,013

(22) Filed: Apr. 18, 2006

(65) Prior Publication Data
US 2007/0195384 A1 Aug. 23, 2007

(30) Foreign Application Priority Data
Feb. 17, 2006 (TW) ................ 095105310

(51) Int. Cl.
*G09G 5/02* (2006.01)
(52) U.S. Cl. ...................... 345/601; 358/520
(58) Field of Classification Search ............. 345/601
See application file for complete search history.

(56) References Cited

U.S. PATENT DOCUMENTS 5,355,225 A * 10/1994 Bachmann et al. ......... 348/645
6,781,716 B1 * 8/2004 Yoda .......................... 358/1.9
2002/0085750 A1 * 7/2002 Hoshuyama ................ 382/162
2003/0012433 A1 * 1/2003 Gruzdev et al. ............ 382/167

FOREIGN PATENT DOCUMENTS

JP 10-23279 6/1996

* cited by examiner

*Primary Examiner*—Xiao M Wu
*Assistant Examiner*—Edward Martello
(74) *Attorney, Agent, or Firm*—Reed Smith LLP; Juan Carlos A. Marquez, Esq.

(57) ABSTRACT

The invention discloses an image processing apparatus for adjusting the saturation of an input image. The input image also has a lightness and a hue. The image processing apparatus includes a look-up table, a processing unit, and a multiplier. The look-up table is used for recording M lightness ranges, N hue ranges, and M*N corresponding gains. The processing unit is used for storing the look-up table and, according to the look-up table, for judging that the lightness of the input image is located in which lightness range, and the hue is located in which hue range, so as to determine a corresponding gain from the gains. The multiplier is coupled to the processing unit and used for multiplying the saturation of the input image by the corresponding gain. Accordingly, the image quality is improved.

12 Claims, 9 Drawing Sheets

| Lightness L | 0 | 1 | 2 | ... | 98 | 99 |
|---|---|---|---|---|---|---|
| Gain-L | G-L0 | G-L1 | G-L2 | ... | G-L98 | G-L99 |

| Hue H | 0 | 1 | 2 | ... | 358 | 359 |
|---|---|---|---|---|---|---|
| Gain-H | G-H0 | G-H1 | G-H2 | ... | G-H358 | G-H359 |

Lightness L=37     Lightness L=59     Lightness L=85

| L \ H | 0~20 | 21~40 | 41~60 | ... | 341~359 |
|---|---|---|---|---|---|
| 0~10 | G11 | G21 | G31 | ... | G181 |
| 11~20 | G12 | G22 | G32 | ... | G182 |
| 21~30 | G13 | G23 | G33 | ... | G183 |
| 31~40 | G14 | G24 | G34 | ... | G184 |
| 41~50 | G15 | G25 | G35 | ... | G185 |
| 51~60 | G16 | G26 | G36 | ... | G186 |
| 61~70 | G17 | G27 | G37 | ... | G187 |
| 71~80 | G18 | G28 | G38 | ... | G188 |
| 81~90 | G19 | G29 | G39 | ... | G189 |
| 91~99 | G20 | G30 | G40 | ... | G190 |

| H / L | 00000 | 00001 | 00010 | 00011 |
|---|---|---|---|---|
| 000 | (26, +0.05, -0.1) | (27, +0.05, -0.1) | (28, +0.1, -0.1) | (30, +0.05, +0.05) |
| 001 | (24, +0.05, +0.05) | (25, +0.05, +0.05) | (26, +0.2, -0.2) | (29, +1.5, -0.2) |
| 010 | (25, +0.05, +0.05) | (26, +0.1, +0.05) | (28, +0.15, +0.05) | (27, +0.1, 0) |

IMAGE PROCESSING APPARATUS AND METHOD OF THE SAME

BACKGROUND OF THE INVENTION

1. Field of the Invention

This present invention relates to an image processing apparatus and a method of the same, and more particularly, to an image processing apparatus and a method of the same for adjusting the saturation of an input image.

2. Description of the Prior Art

Figure 1:
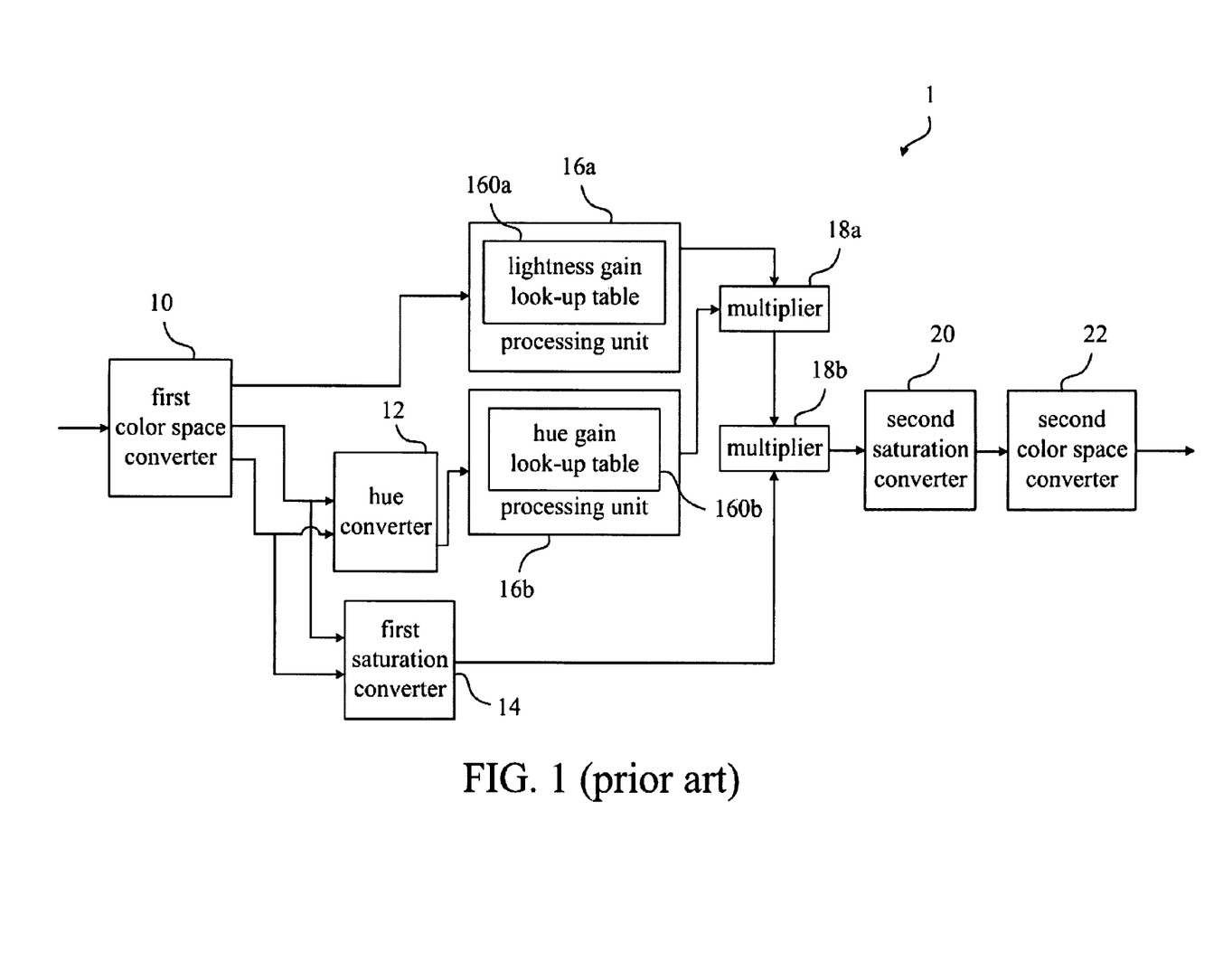
FIG. 1 is a function block diagram illustrating an image processing apparatus of the prior art.
Figure 2A:
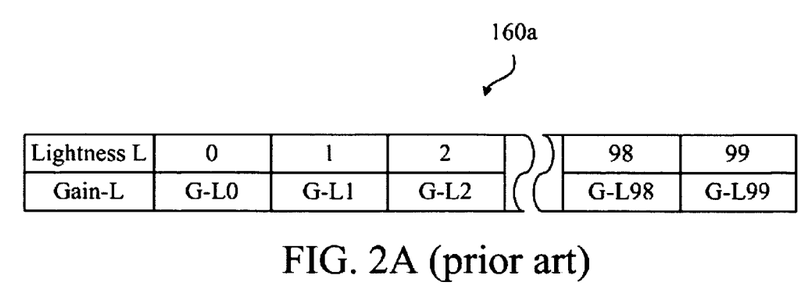
FIG. 2A is a portion of the lightness gain look-up table 160a in FIG. 1.
Figure 2B:
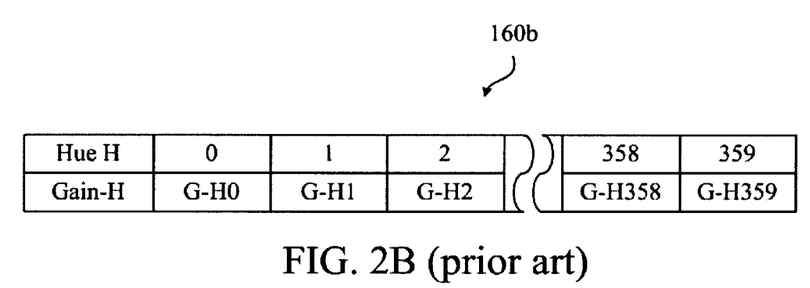
FIG. 2B is a portion of the hue gain look-up table 160b in FIG. 1.

In current display apparatus, users can adjust the color saturation of an image to enhance the display of the image via an OSD (on screen display) system. Referring to FIG. 1, FIG. 2A, and FIG. 2B, FIG. 1 is a function block diagram illustrating an image processing apparatus 1 of the prior art; FIG. 2A is a schematic diagram showing portions of the lightness gain look-up table 160a in FIG. 1, and FIG. 2B is a schematic diagram showing portions of the hue gain look-up table 160b in FIG. 1. The image processing apparatus 1 includes a first color space converter 10, a hue converter 12, a first saturation converter 14, processing units 16a and 16b, multipliers 18a and 18b, a second saturation converter 20, and a second color space converter 22. The processing unit 16a stores the lightness gain look-up table 160a, as shown in FIG. 2A, and the processing unit 16b stores the hue gain look-up table 160b, as shown in FIG. 2B.

The first color space converter 10 converts an input image from RGB color space into Lab color space, wherein L represents the lightness of the input image, and a and b represent the color elements of the input image. The hue converter 12 converts the color elements a and b to the hue H of the input image, wherein the hue H of the input image is defined as $$H = \tan^{-1}\left(\frac{b}{a}\right).$$

The first saturation converter 14 converts the color elements a and b to the saturation S of the input image, wherein the saturation S is defined as $S=\sqrt{a^2+b^2}$.

The processing unit 16a determines the lightness gain (Gain-L) in accordance with the lightness L of the input image and the lightness gain look-up table 160a. The processing unit 16b determines the hue gain (Gain-H) in accordance with the hue H of the input image and the hue gain look-up table 160b. Then, the multiplier 18a multiplies the lightness gain, Gain-L, by the hue gain, Gain-H, to get the saturation gain, Gain-S, and the multiplier 18b multiplies the saturation gain, Gain-S, by the saturation of the input image to get an adjusted saturation.

The second saturation converter 20 converts the adjusted saturation to color elements a and b. Furthermore, the second color space converter 22 converts the input image output by converter 20 from Lab color space into RGB color space.

Figure 3A:
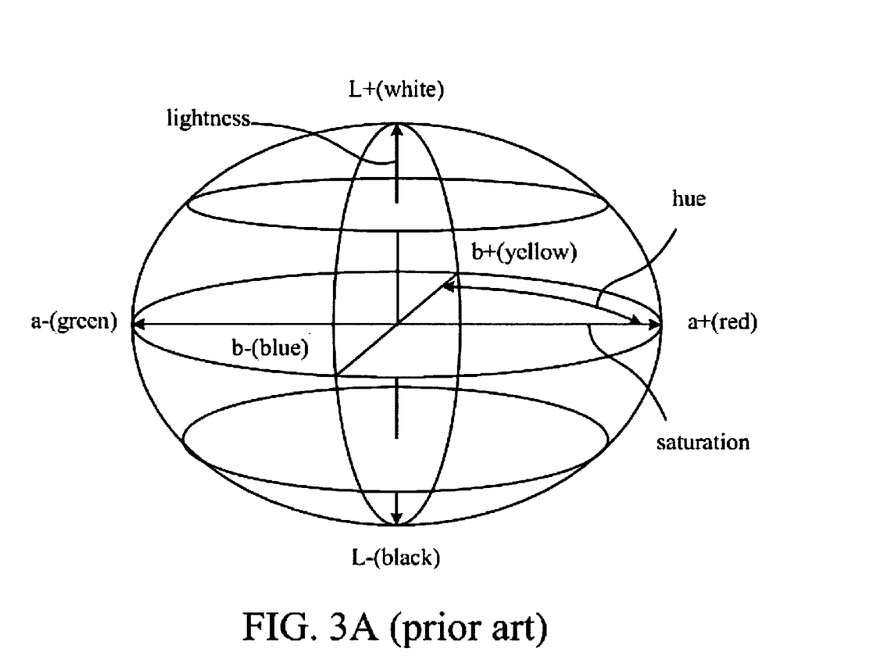
FIG. 3A is a diagram illustrating Lab color space.
Figure 3B:
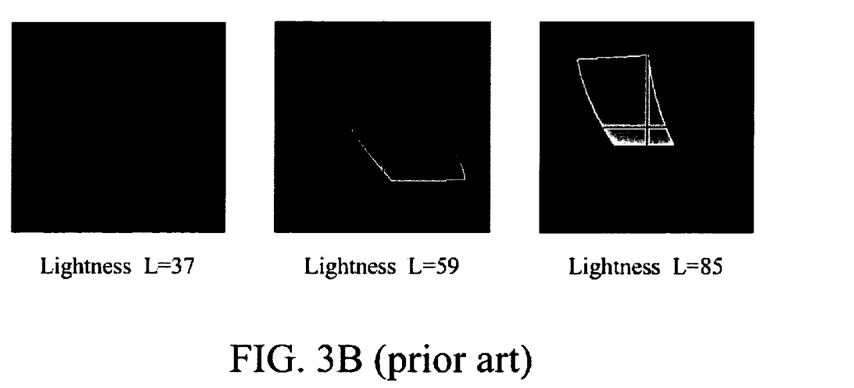
FIG. 3B is a series of diagrams respectively illustrating a saturation area at different lightness in Lab color space.

Referring to FIG. 3A and FIG. 3B, FIG. 3A is a diagram illustrating Lab color space, and FIG. 3B is a series of diagrams respectively illustrating a saturation area at different lightness in Lab color space. As shown in FIG. 3A, in Lab color space, lightness L is controlled by height, hue H is controlled by angle, and saturation S is controlled by radius. According to the above, the image processing apparatus 1 of the prior art adjusts the saturation of the input image in accordance with the lightness gain, Gain-L, and the hue gain, Gain-H. However, as shown in FIG. 3B, a saturation area of the hue varies with different lightness of an input image. Because the cross section along the L axis of the color space of each lightness is different, and each hue (angle) corresponds to a different saturation range, if the lightness gain Gain-L is determined in accordance with the lightness of the input image, and the hue gain Gain-H is determined in accordance with the hue of the input image, it is not easy to control the level of saturation, thus causing deviation in color.

Accordingly, a scope of the present invention provides an image processing apparatus and a method of the same to solve the question mentioned above.

SUMMARY OF THE INVENTION

A scope of the present invention provides an image processing apparatus and a method of the same. The image processing apparatus adjusts the saturation of an input image in accordance with the lightness of the input image and the hue of the input image. Accordingly, the image quality is improved.

According to a first preferred embodiment of the present invention, the image processing apparatus is used for adjusting the saturation of an input image. The input image includes a lightness and a hue. The image processing apparatus includes a look-up table, a processing unit, and a multiplier.

According to the first preferred embodiment of the present invention, the look-up table is used for recording M lightness ranges, N hue ranges, and M*N gains. Each of the M*N gains corresponds to one of the M lightness ranges and one of the N hue ranges, wherein M and N are natural numbers. The processing unit stores the look-up table and judges, according to the look-up table, that the lightness of the input image locates in which lightness range, and the hue locates in which hue range, so as to determine the corresponding gain from the gains. The multiplier is coupled to the processing unit and multiplies the saturation of the input image by the corresponding gain.

Therefore, the image processing apparatus of the present invention adjusts the saturation of an input image in accordance with the lightness of the input image and the hue of the input image, so as to improve the color saturation of the input image. Accordingly, the quality of the image is improved.

The advantage and spirit of the invention may be understood by the following recitations together with the appended drawings.

DETAILED DESCRIPTION OF THE INVENTION

Figure 4:
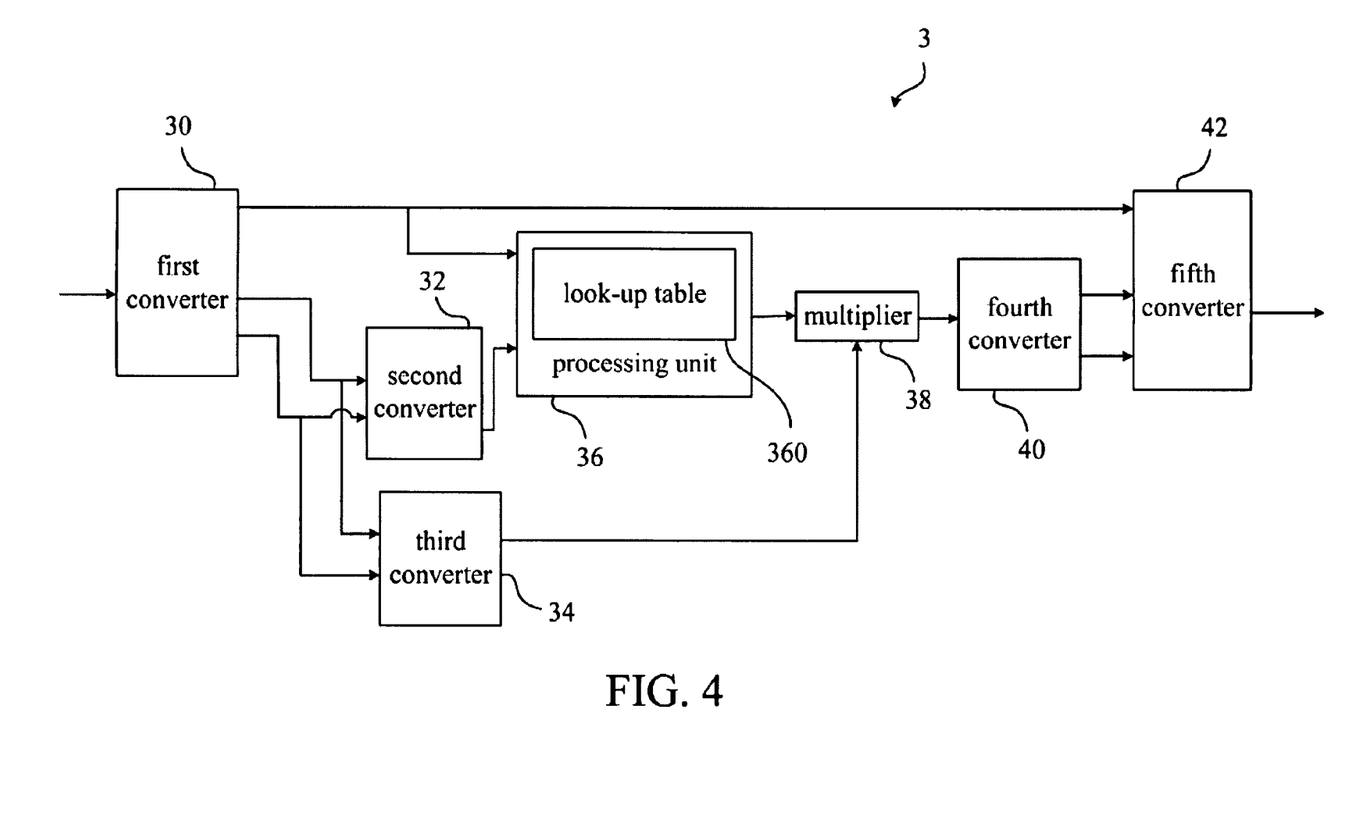
FIG. 4 is a function block diagram illustrating an image processing apparatus in accordance with the first preferred embodiment of the invention.

Referring to FIG. 4, FIG. 4 is a function block diagram illustrating an image processing apparatus 3 in accordance with the first preferred embodiment of the present invention. According to the first preferred embodiment, the image processing apparatus 3 adjusts the saturation S of an input image. The input image has a lightness L and a hue H. The input image is in RGB color space.

As shown in FIG. 4, the image processing apparatus 3 includes a first converter 30, a second converter 32, a third converter 34, a processing unit 36, a multiplier 38, a fourth converter 40 and a fifth converter 42. The processing unit 36 stores a look-up table 360 for recording M lightness ranges, N hue ranges, and M*N gains. Each of the M*N gains corresponds to one of the M lightness ranges and one of the N hue ranges, wherein M and N are natural numbers. The first converter 30 is coupled to the processing unit 36. The second converter 32 is coupled between the first converter 30 and the processing unit 36. The third converter 34 is coupled between the first converter 30 and the multiplier 38, while the multiplier 38 is also coupled to the processing unit 36. The fourth converter 40 is coupled to the multiplier 38. The fifth converter 42 is coupled to the fourth converter 40 and the first converter 30 respectively.

Figure 5:
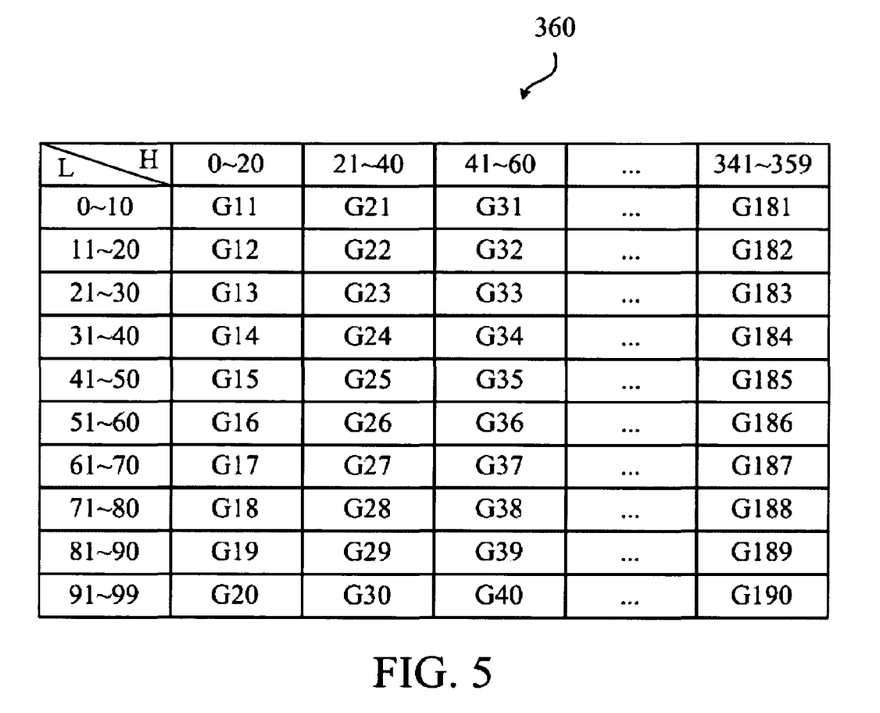
FIG. 5 is a portion of the look-up table 360 in FIG. 4.

Referring to FIG. 5, FIG. 5 is a schematic diagram showing a portion of the look-up table 360 in FIG. 4. According to the first preferred embodiment, the look-up table 360 records 10 lightness ranges, 18 hue ranges, and 10*18 gains, as shown in FIG. 5. It should be noted that the lightness ranges, the hue ranges, and the gains recorded in the look-up table 360 can be set differently according to various requests.

According to the first preferred embodiment, the first converter 30 converts the input image from RGB color space into Lab color space, wherein L represents lightness, and a and b represent color elements. The second converter 32 converts the color elements a and b into the hue, wherein the hue is defined as $$H = \tan^{-1}\left(\frac{b}{a}\right).$$

The third converter 34 converts the color elements a and b into a saturation, wherein the saturation is defined as $S+\sqrt{a^2+b^2}$. The processing unit 36 determines, according to the look-up table 360, which of the 10 lightness ranges the lightness of the input image falls into, and which of the 18 hue ranges the hue of the input image falls into, so as to determine the corresponding gain from the gains. For example, if the lightness of the input image is 15, and the hue of the input image is 30, the processing unit 36 determines the corresponding gain G22 in accordance with the look-up table 360. Then, the multiplier 38 multiplies the saturation of the input image by the corresponding gain G22 to get an adjusted saturation. The fourth converter 40 converts the adjusted saturation into color elements a and b in Lab color space. Finally, the fifth converter 42 converts the input image from Lab color space into RGB color space. Accordingly, the adjustment of the saturation of the input image is completed in accordance with the lightness of the input image and the hue of the input image.

Figure 6:
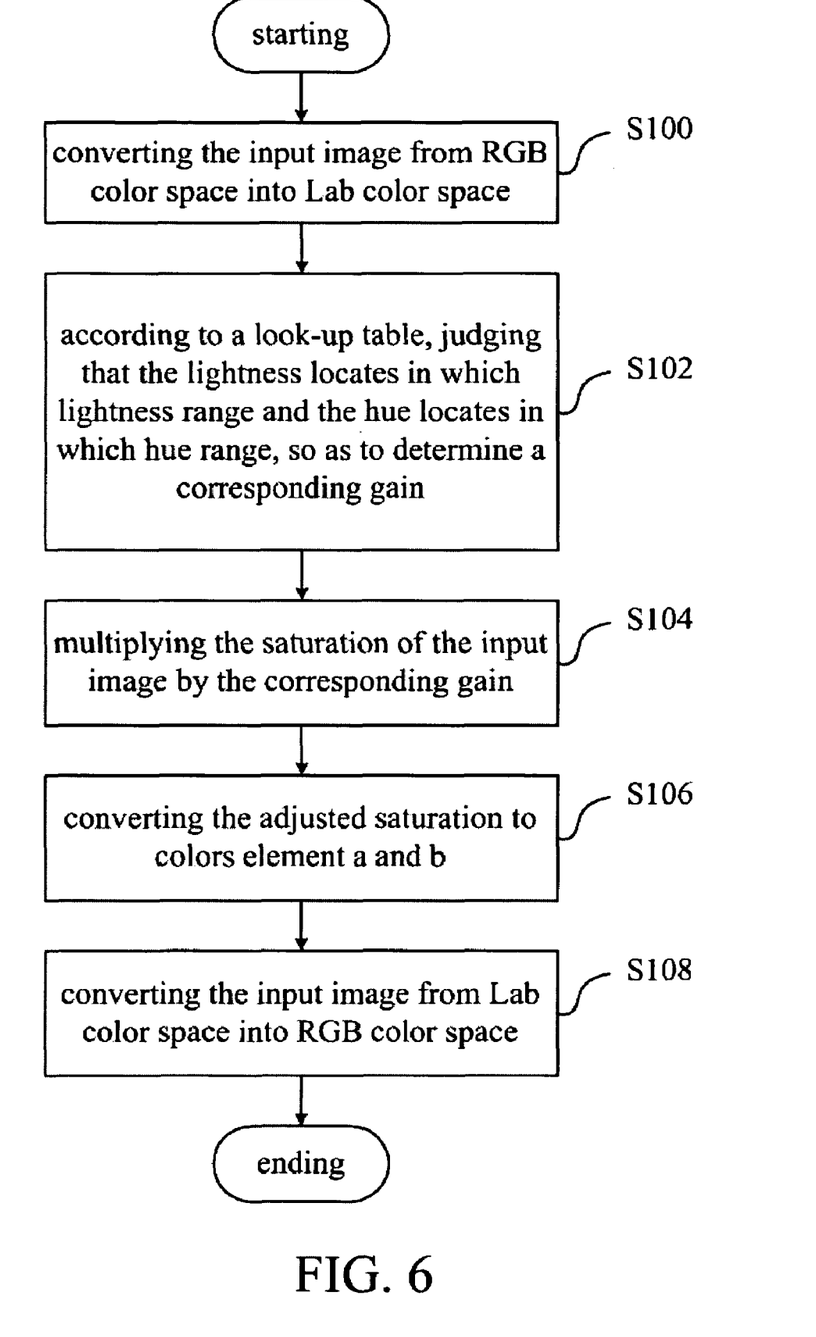
FIG. 6 is a flow chart showing an image processing method in accordance with the first preferred embodiment of the invention.

Referring to FIG. 6, FIG. 6 is the flow chart of the image processing method in accordance with the first preferred embodiment of the present invention. Referring to FIG. 4 and FIG. 5 together with FIG. 6, the image processing method of the present invention adjusts the saturation of an input image. The input image has a lightness and a hue. According to the first preferred embodiment, the image processing method of the present invention includes the following steps:

step S100: converting the input image from RGB color space into Lab color space;

step S102: according to the look-up table 360, judging that the lightness of the input image locates in which one of the lightness ranges, and the hue of the input image locates in which one of the hue ranges, so as to determine the corresponding gain;

step S104: multiplying the saturation of the input image by the corresponding gain to get an adjusted saturation;

step S106: converting the adjusted saturation into color elements a and b; and step S108: converting the input image from Lab color space into RGB color space.

Figure 7:
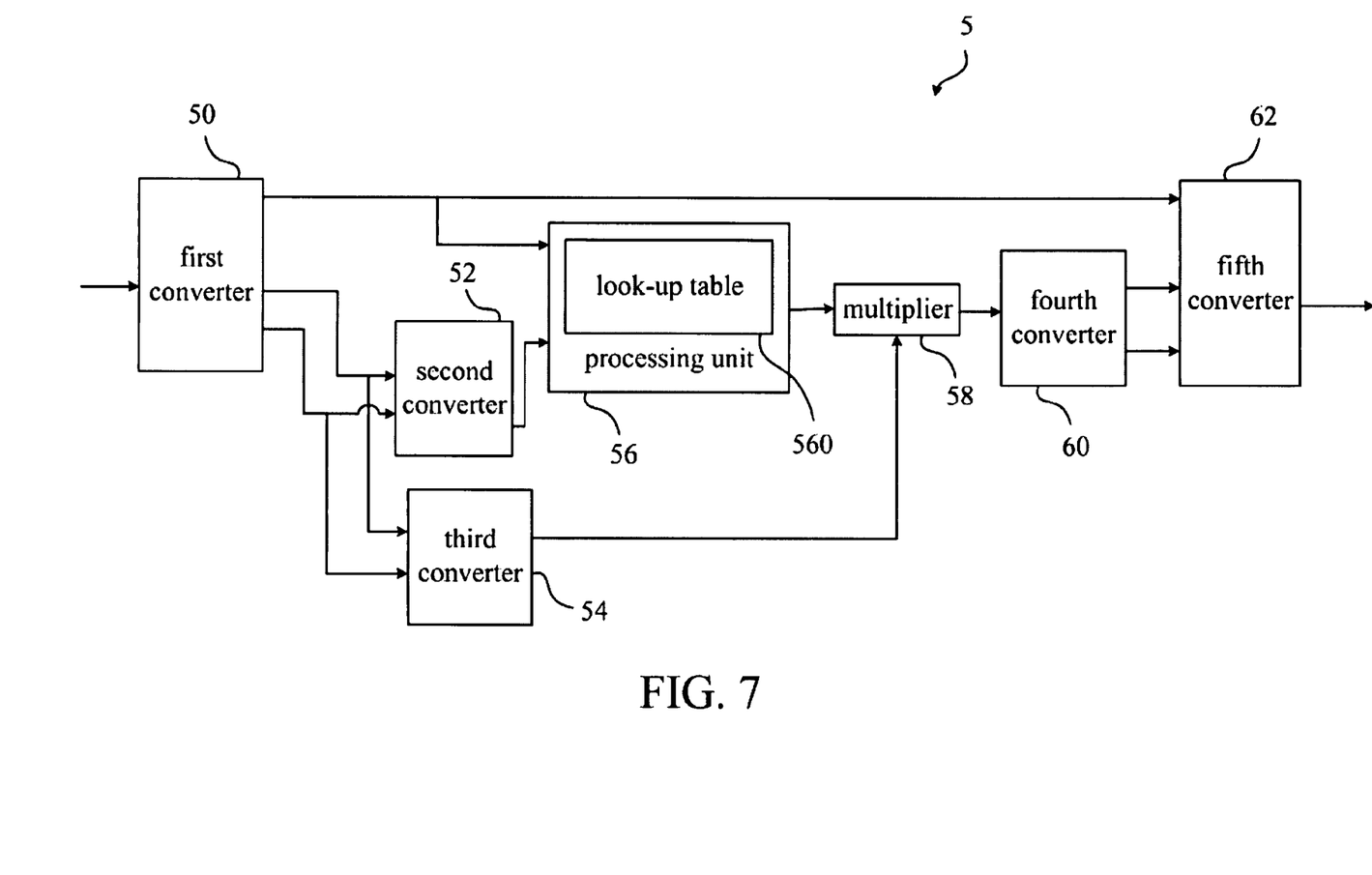
FIG. 7 is a function block diagram illustrating an image processing apparatus in accordance with the second preferred embodiment of the invention.

Referring to FIG. 7, FIG. 7 is a function block diagram illustrating an image processing apparatus 5 in accordance with a second preferred embodiment of the present invention. According to the second preferred embodiment, the image processing apparatus 5 adjusts the saturation S of an input image. The input image also has a lightness L and a hue H. The input image is in RGB color space.

As shown in FIG. 7, the image processing apparatus 5 includes a first converter 10 50, a second converter 52, a third converter 54, a processing unit 56, a multiplier 58, a fourth converter 60, and a fifth converter 62. The processing unit 56 stores a look-up table 560 for recording M lightness values, N hues values, and M*N correction parameters. Each of the M*N correction parameters corresponds to one of the M lightness values and one of the N hue values respectively, wherein M and N are natural numbers. The first converter 50 is coupled to the processing unit 56. The second converter 52 is coupled in between the first converter 50 and the processing unit 56. The third converter 54 is coupled in between the first converter 50 and the multiplier 58 while the multiplier 58 is also coupled to the processing unit 56. The fourth converter 60 is coupled to the multiplier 58. The fifth converter 62 is coupled to the first converter 50 and the fourth converter 60 respectively.

Figure 8:
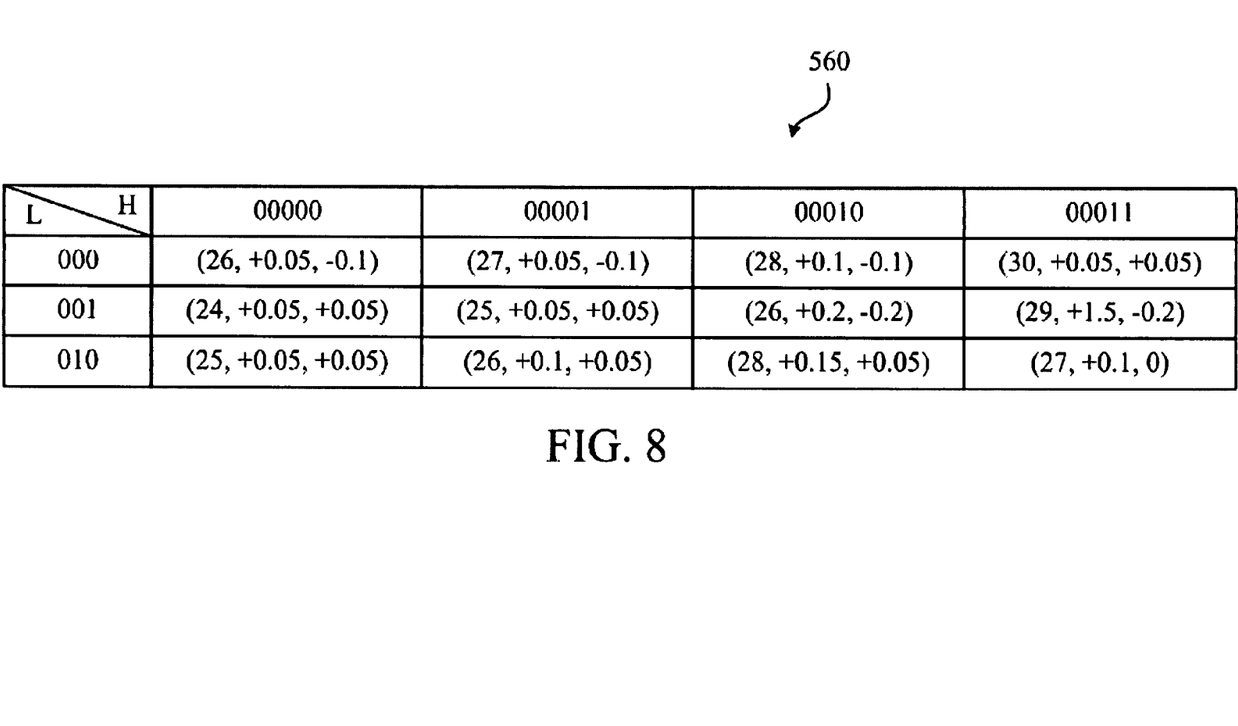
FIG. 8 is a portion of the look-up table 560 in FIG. 7.

According to the second preferred embodiment, the lightness of the input image has i binary high bits, and the hue of the input image has k binary high bits, wherein i and k are natural numbers. Each of the M lightness values in the look-up table 560 is expressed as an i-bit binary, and each of the N hue values in the look-up table 560 is expressed as a k-bit binary. Moreover, the lightness of the input image has j binary low bits, and the hue of the input image has p binary low bits, wherein j and p are natural numbers. Each of the M*N correction parameters includes a gain G, a lightness offset (L_offset) and a hue offset (H_offset), expressed as (G, H_offset, L_offset).

Referring to FIG. 8, FIG. 8 is a portion of the look-up table 560 in FIG. 7. According to the second preferred embodiment, there are 3 lightness values, 4 hue values, and 3*4 correction parameters in the look-up table 560, as shown in FIG. 8. It should be noted that the lightness values, the hue values, and the correction parameters in the look-up table 560 could be set in different ways according to various demands.

According to the second preferred embodiment, the first converter 50 converts the input image from RGB color space into Lab color space, wherein L represents lightness, and a and b represent color elements. The second converter 52 converts the color elements a and b into the hue, wherein the hue is defined as $$H = \tan^{-1}\left(\frac{b}{a}\right).$$

The third converter 54 converts the color elements a and b into the saturation, wherein the saturation is defined as $S=\sqrt{a^2+b^2}$. The processing unit 56 determines the corresponding correction parameter (G. H_offset, L_offset) in accordance with the i binary high bits of the lightness, the k binary high bits of the hue, and the look-up table 560. Furthermore, the processing unit 56 calculates the saturation gain $G_S$ in accordance with the corresponding correction parameter. The saturation gain is obtained by the following formula:

$$G_S = G + j\_binary * L\_offset + p\_binary * H\_offset \quad \text{formula 1:}$$

wherein j_binary is the value of the j binary low bits, and p_binary is the value of the p binary low bits.

For example, if the lightness of the input image is 31, and the hue of the input image is 25, the lightness of the input image is expressed as 001-1111, and the hue of the image is expressed as 00001-1001, wherein i equals to 3, j equals to 4, k equals to 5, and p equals to 4. The processing unit 56 determines the corresponding correction parameter (25, +0.05, +0.05) in accordance with the 3 binary high bits of lightness (001), the 5 binary high bits of hue (00001), and the look-up table 560. Furthermore, the processing unit 56 calculates the saturation gain $G_S$(26.3) by formula 1 in accordance with the corresponding correction parameter (25, +0.05, +0.05), wherein j_binary equals to 15, and p_binary equals to 9.

Afterwards, the multiplier 58 multiplies the saturation of the input image by the saturation gain $G_S$ to get an adjusted saturation. The fourth converter 60 converts the adjusted saturation into color elements a and b in Lab color space. Finally, the fifth converter 62 converts the input image from Lab color space into RGB color space. Accordingly, the adjustment of the saturation of the input image is completed in accordance with the lightness of the input image and the hue of the input image. Moreover, adjusting the gain G in accordance with a lightness offset L_offset and a hue offset H_offset further avoids color discontinuity of the input image, thus improving the quality of the image.

Figure 9:
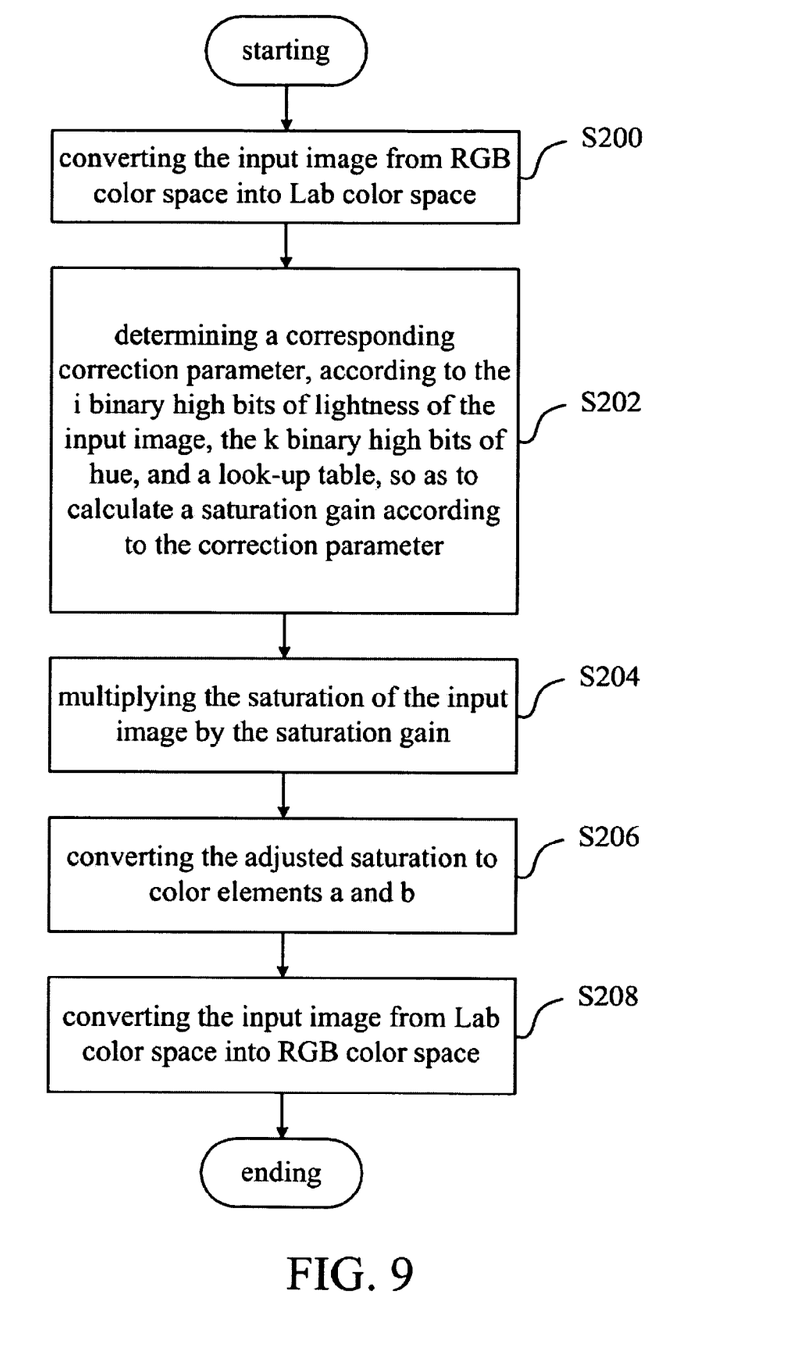
FIG. 9 is a flow chart showing an image processing method in accordance with the second preferred embodiment of the invention.

Referring to FIG. 9, FIG. 9 is a flow chart showing an image processing method in accordance with the second preferred embodiment of the invention. Referring to FIG. 7 and FIG. 8 together with FIG. 9, the image processing method of the present invention adjusts the saturation of an input image. The input image has a lightness and a hue. According to the second preferred embodiment, the image processing method of the present invention includes the following steps:

step S200: converting the input image from RGB color space into Lab color space;

step S202: determining the corresponding correction parameter (G, H_offset, L_offset) in accordance with the i binary high bits of the lightness of the input image, the k binary high bits of the hue of the input image, and the look-up table 560, so as to calculate the saturation gain $G_S$ in accordance with the corresponding correction parameter;

step S204: multiplying the saturation of the input image by the saturation gain $G_S$ to get an adjusted saturation;

step S206: converting the adjusted saturation into color elements a and b; and step S208: converting the input image from Lab color space into RGB color space.

Compared with the prior art, the image processing apparatus and the method of the same of the present invention adjust the saturation of an input image in accordance with the lightness of the input image and the hue of the input image, so as to enhance the color saturation of the input image. Accordingly, the image quality is improved. Moreover, according to the second preferred embodiment, adjusting the gain in accordance with the lightness offset and the hue offset further avoids color discontinuity of the input image, thus improving the quality of the image.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An image processing apparatus for adjusting a saturation of an input image also having a lightness and a hue, said image processing apparatus comprising:

a look-up table for recording M lightness values, N hue values and M*N correction parameters, each of the parameters corresponding to one of the M lightness values and one of the N hue values, wherein N and M are natural numbers;

a processing unit for storing the look-up table, determining a corresponding parameter in accordance with the lightness of the input image, the hue of the input image, and the look-up table to calculate a saturation gain in accordance with the corresponding correction parameter; and a multiplier, coupled to the processing unit, for multiplying the saturation of the input image by the saturation gain to get an adjusted saturation;

wherein the lightness has i binary high bits, the hue has k binary high bits, i and k are natural numbers, each of the M lightness values in the look-up table is expressed as an i-bit binary, and each of the N hue values is expressed as a k-bit binary, the lightness has j binary low bits, the hue has p binary low bits, j and p are natural numbers, each of the M*N correction parameters comprises a gain G, a lightness offset L offset, and a hue offset H offset, and the saturation gain $G_S$ is obtained by the following formula:

$$G_S = G + j\_binary * L\_offset + p\_binary * H\_offset$$

j binary is the value of the j binary low bits, and p binary is the value of the p binary low bits.

2. The image processing apparatus of claim 1, further comprising a first converter coupled to the processing unit, wherein the input image is in RGB color space, the first converter functions converting the input image in RGB color space, from RGB color space into Lab color space, L represents the lightness of the input image, and a and b represent color elements of the input image.

3. The image processing apparatus of claim 2, further comprising a second converter coupled to the first converter and the processing unit, wherein the second converter functions converting the color elements a and b into the hue, which is defined as follows:

$$H = \tan^{-1}\left(\frac{b}{a}\right).$$

4. The image processing apparatus of claim 2, further comprising a third converter coupled to the first converter and the multiplier, wherein the third converter functions converting the color elements a and b into the saturation, which is defined as follows:

$$S=\sqrt{a^2+b^2}.$$

5. The image processing apparatus of claim 2, further comprising a fourth converter coupled to the multiplier, wherein the fourth converter functions converting the adjusted saturation into the color elements a and b.

6. The image processing apparatus of claim 5, further comprising a fifth converter coupled to the first converter and the fourth converter, wherein the fifth converter functions converting the input image from Lab color space into RGB color space.

7. An image processing method for adjusting a saturation of an input image also having lightness and a hue, said image processing method comprising:

(a) determining a corresponding correction parameter in accordance with the lightness, the hue, and a look-up table in a processing unit to calculate a saturation gain in accordance with the corresponding correction parameter, wherein the look-up table is used for recording the M lightness values, the N hue values, and the M*N correction parameters, each of which corresponds to one of the M lightness values and one of the N hue values, and M and N are natural numbers; and (b) multiplying the saturation of the input image by the saturation gain to get an adjusted saturation;

wherein the lightness has i binary high bits, the hue has k binary high bits, i and k are natural numbers, each of the M lightness values in the look-up table is expressed as an i-bit binary, and each of the N hue values is expressed as a k-bit binary, the lightness has j binary low bits, the hue has p binary low bits, j and p are natural numbers, each of the M*N correction parameters comprises a gain G, a lightness offset L_offset, and a hue offset H_offset, and the saturation gain $G_s$ is obtained by the following formula:

$$G_s+G+j\_binary*L\_offset+p\_binary*H\_offset$$

j_binary is the value of the j binary low bits, and p_binary is the value of the p binary low bits.

8. The image processing method of claim 7, further comprising the step of:

prior to step (a), converting the input image from RGB color space into Lab color space, wherein L represents the lightness of the input image, and a and b represent color elements of the input image.

9. The image processing method of claim 8, wherein, according to the color elements a and b, the hue is defined as follows:

$$H = \tan^{-1}\left(\frac{b}{a}\right).$$

10. The image processing method of claim 8, wherein, according to the color elements a and b, the saturation is defined as follows:

$$S=\sqrt{a^2+b^2}.$$

11. The image processing method of claim 8, further comprising the step of:

(c) converting the adjusted saturation to the color elements a and b.

12. The image processing method of claim 11, further comprising the step of:

(d) converting the input image from Lab color space into RGB color space.

* * * * *